United States Patent [19]
Nakagawa

[11] Patent Number: 5,583,918
[45] Date of Patent: Dec. 10, 1996

[54] CREDIT CARD-BASED ACCOUNTING SERVICE SYSTEM FOR A NETWORK

[75] Inventor: Yukinori Nakagawa, Kawasaki, Japan

[73] Assignee: Fujitsu Limited, Kawasaki, Japan

[21] Appl. No.: 277,565

[22] Filed: Jul. 20, 1994

[30] Foreign Application Priority Data

Feb. 17, 1994 [JP] Japan ................... 6-020037

[51] Int. Cl.⁶ ................................. H04Q 7/20
[52] U.S. Cl. ................... 379/61; 379/58; 379/91; 379/112; 379/114; 379/121; 379/144; 379/145
[58] Field of Search .................... 379/58, 59, 61, 379/63, 91, 111, 112, 114, 121, 144, 145; 455/33.1; 235/380, 381

[56] References Cited

U.S. PATENT DOCUMENTS

| | | | |
|---|---|---|---|
| 4,776,003 | 10/1988 | Harris | 379/91 |
| 4,860,341 | 8/1989 | D'Avello et al. | 379/91 |
| 4,951,308 | 8/1990 | Bishop et al. | 379/91 |
| 4,965,821 | 10/1990 | Bishop et al. | 379/91 |
| 5,138,650 | 8/1992 | Stahl et al. | 379/61 |
| 5,148,472 | 9/1992 | Freese et al. | 379/59 |
| 5,325,418 | 6/1994 | McGregor et al. | 379/59 |

FOREIGN PATENT DOCUMENTS

| | | |
|---|---|---|
| 62-36956 | 2/1987 | Japan. |
| 1-206767 | 8/1989 | Japan. |

Primary Examiner—William Cumming
Assistant Examiner—G. J. Oehling
Attorney, Agent, or Firm—Staas & Halsey

[57] ABSTRACT

Data terminal equipments placed in a rental company and a mass retailer are interconnected via a data transfer network over an intelligent network for rendering an accounting service. The intelligent network accommodates a credit accounting service manager and a credit accountant. In response to a subscriber registration request for a credit accounting service issued from a data terminal equipment, the credit accounting service manager stores a credit card member number and a subscriber number of a portable telephone as a pair in a database. In response to a call setup request issued from a registered telephone, the credit accountant retrieves a credit card member number from the database using a subscriber number and produces credit withdrawal information.

14 Claims, 14 Drawing Sheets

CREDIT CARD-BASED ACCOUNTING SERVICE SYSTEM FOR A NETWORK

BACKGROUND OF THE INVENTION

1. Field of the Invention

The present invention relates to an accounting service system designed for personal communications including mobile telephoning. More particularly, this invention is concerned with an accounting service system for rendering a credit card-based accounting service using network facilities.

2. Description of the Related Art

In recent years, mobile communication services including a mobile telephone service have been drastically changing in terms of quality and quantity alike. The day when everybody can enjoy mobile telephony as readily as ordinary telephony has come around the corner. In Japan, Nippon Telegraph & Telephone Corp. (NTT) commenced an 800 MHz-band mobile telephone service in December 1979. This was succeeded by communicative liberalization. In 1988, a new common carrier (NCC) was founded to offer mobile telephones.

With the introduction of the above principle of competition and the advent of smaller portable telephones, the number of users of mobile telephones has been increasing progressively. The number of subscribers as of the end of March 1993 is about 1,700,000. By 2000, the mobile telephone market is expected to grow to hold as many users as 10 million. The sale of mobile portable telephones has been authorized since April 1994. Mobile portable telephones are now on sale in mass retailers for home electric appliances.

On the other hand, the number of issued credit cards in Japan is 203 million as of the end of 1992. This figure means that each of the Japanese people including 0-year-old infants has about two credit cards. It is no exaggeration to say that Japan has become as big a card-oriented nation as has the United States of America. With the relaxation of restrictions on credit cards, credit card companies in the fields of manufacturing and distribution industries will be able to explore business changes. In the near future, the exploration will be liberated fully. Credit cards relating to distribution and manufacturing industries will be able to be used at any shops. Under these circumstances, the rental business of portable telephones is expanding steadfastly. Users are recognizing that it is more convenient to utilize rental companies than to enter into a contract directly with communication companies.

When a portable telephone is rented, generally, the rental is paid to a rental company, while a basic communication fee and a speech fee are paid directly to a mobile communication company. Thus, a user has to pay money to a plurality of companies and take complex steps for the payment. After application for rental is completed, before a product is delivered, it takes more than 20 days to complete clerical work such as creation of an application form, investigation, issuance of a bill and confirmation of payment. It is therefore impossible to use such portable telephones at an event ground for a short period such as a half a day or a whole day. Due to the authorization of the sale of mobile terminals, a mobile terminal unit may be purchased at a mass retailer of home electric appliances. The purchased mobile terminal unit cannot however be put to use immediately because it takes some time for a mobile communication company to complete a procedure (service order) of registering the terminal unit in an exchange.

In order to overcome these drawbacks, a credit accounting service based on credit card system portable telephones has been devised and disclosed in, for example, Japanese Patent Laid-Open No.62-36956. Specifically, when issued, a credit card is inserted into a reading feature implemented in a personal communication terminal unit such as a mobile telephone. The read credit card member number is transmitted to a network. Credit accounting information is then produced. For settlement, a speech fee is billed to a credit card company.

The foregoing conventional credit accounting service based on credit card system portable telephones poses problems described below. To begin with, a credit card reading feature such as a card reader must be included in a portable terminal unit. This impairs the characteristic of a portable terminal unit that it is compact and lightweight, and leads to an increase in cost. In addition, a sequence for certifying a credit card must be newly added to a speech setup sequence conformable to, for example, the RCR STD-28 (standard for second-generation cordless telephone systems complied by the Electromagnetic System Development Center) standardized for networks. This results in complex sequences executed on the side of a network. Moreover, when a call is originated from a telephone, a credit card remains inserted into the telephone. Loading and unloading a credit card becomes a nuisance, which impairs ease of operation. Whenever a rented or purchased telephone is involved, it takes some time for a mobile communication company to complete a procedure of registering the telephone in an exchange. The telephone cannot therefore be used immediately after the rental or purchase.

SUMMARY OF THE INVENTION

The present invention provides a credit card-based accounting service system for obviating the necessity of reading a credit card by a subscriber terminal unit such as a mobile telephone and enabling online processing of a subscriber registration request and immediate use of a mobile telephone.

The present invention applies to a credit card accounting service based on an intelligent network that manages various user-related services, controls connections between subscriber terminals such as portable telephones, and accounts to subscribers. Data terminal equipment placed at rental companies or mass retailers are interconnected over the intelligent network via a data transmission network such as a packet network.

The network accommodates a credit accounting service manager and a credit accountant. In response to a subscriber registration request for a credit accounting service issued from a data terminal equipment, the credit accounting service manager stores a credit card member number and subscriber number of a portable telephone as a pair in a database. In response to a connection request issued from a registered portable telephone, the credit accountant retrieves a credit card member number from the database using the subscriber number, and produces credit withdrawal information.

A data terminal equipment therefore sends at least a subscriber number and a credit card member number as subscriber registration information. The credit accounting service manager checks the credit card member number acquired from the subscriber registration information so as to see if an associated credit card has been used illegally. If the credit card has not been used illegally, the subscriber is registered. When the credit accounting service manager registers a subscriber, the credit accountant produces credit withdrawal information concerning a basic subscription fee. When a subscriber terminal unit issues a speech setup request, the credit accountant produces credit withdrawal information concerning a speech fee. In response to a registration cancellation request for the credit accounting service issued from a data terminal equipment, the credit accounting service manager cancels a credit card member number stored in a database. At this time, the credit accountant produces credit withdrawal information concerning a settled account of communication expenses.

The intelligent network comprises a high-order advanced capability layer and a low-order transmission layer. The advanced capability layer accommodates a service management unit for managing various user-related services and a service control unit for controlling connections between subscriber terminal units including portable telephones. The low-order transmission layer accommodates a plurality of exchanges interconnected over a common line signaling network and base stations for portable telephones connected to the exchanges. In response to a speech setup request issued from a portable telephone, the service control unit in the advanced capability layer retrieves a credit card member number from a database using a subscriber number, and produces service switching point speech information (hereinafter, SSP speech information) containing a credit card member number within an exchange for each speech. The SSP speech information contains not only a credit card member number but also a calling party number, a called party number, calling-side location information, called-side location information, and an accounting object number, activation time information, response time information, and clearance time information which are produced by an exchange.

In response to a call setup request, the service control unit in the advanced capability layer checks a credit card member number retrieved from the database to see if an associated credit card has been used illegally. If the credit card has not been used illegally, speech setup control is executed normally. If the credit card has been used illegally, speech setup control is terminated forcibly. For forcible termination, a message indicating the fact is issued to a calling party. When it is determined that the credit card has been used illegally, SSP speech information produced by an exchange is recorded and held. Information to be recorded and held includes, for example, a calling party number, a called party number, an activation time, a portable telephone ID, and a base station ID.

When receiving a subscriber registration request from a data terminal equipment placed in a rental company, the credit accounting service manager registers an effective period defined with the number of hours, days, or months during which a subscriber terminal unit is available. When the effective period expires, communication services may be stopped. In addition, the credit accounting service manager registers an expiration year/month of a credit card. When the expiration year/month comes, the communication services may be stopped.

The present invention can furnish the credit card accounting service with portability. To be more specific, assume that a subscriber number of a portable telephone used, for example, in Tokyo and an associated credit card member number have been registered. Thereafter, when the intelligent network receives a subscriber registration request relative to another portable telephone to be used by the same subscriber in another district, for example, Osaka from a data terminal equipment, the intelligent network stores a new subscriber number, with which the subscriber bas requested to be registered, in linkage with the credit card member number in the database. In response to a call setup request issued from another cordless mobile telephone, the intelligent network renders a credit card accounting communication service retrieved from the database using the subscriber number.

The intelligent network employed according to the present invention can not only render the credit accounting service but also store in a database one communication service mode or a plurality of communication service modes requested by a subscriber together with a subscriber number and a credit card member number in response to a subscriber registration request issued from a data terminal equipment, and render a communication service retrieved from the database using the subscriber number in response to a call setup request issued from a subscriber terminal unit. The communication services include, for example, a call forwarding service, a three party service, and a camp-on service.

The usage of the aforesaid accounting service system relating to the present invention will be described below. To begin with, assuming that a portable telephone is lent on a rental basis, one of the most important things is investigation of a personal credit standing. According to the present invention, since a credit card is employed, the investigation work of a personal credit standing is tightened drastically. Initially, a rental company enters into a contract of affiliation for handling of rentals of portable telephones with a credit card company. A mobile communication company makes a contract of affiliation with the credit card company. The rental company connects its own data terminal equipment to a service management unit in a mobile communication company over a public packet network. A subscriber registration request issued by the rental company that is, a request for registration for a credit card accounting service (service order) is issued online to the mobile communication company by means of the data terminal equipment. A database in the mobile communication company stores black data for use in discarding illegal credit cards that have been stolen or counterfeited, which has been supplied by the credit card company. Using the black data, it is checked if a credit card associated with a credit card member number with which a registration request has been issued has been used illegally. If the associated credit card has not be used illegally, the credit card member number is stored in the database with a subscriber number as a key. Thus, an exchange can handle a call setup request.

After registering for a credit card accounting service, a subscriber telephone is operated as mentioned below. A called party number is entered by dialing a portable telephone, and a Start button is pressed. An exchange receives a call setup request and starts calling. At this time, a subscriber number or a subscriber's telephone number is used as a key in order to retrieve a credit card member number from a database. When the credit card member number has been registered, if necessary, it is checked according to black data whether or not the associated credit card has been used illegally. If there is no problem, the credit card member number is specified in speech information. Thus, speech information containing a credit card member number, which is required to render the credit accounting service, is acquired. When speech terminates, the speech information is sent online to an accounting center and used for summation. A personal communication terminal unit can therefore be used on a rental basis for a short period of time, for example, several hours at an event ground.

When a personal communication telephone is purchased at a mass retailer of home electric appliances, if a credit accounting service is rendered, the telephone can be used immediately. Moreover, since a credit card company settles up communication fees including a basic communication fee and a speech fee, a user need not pay directly for a bill issued by a communication company. Furthermore, a credit card reading feature need not be implemented in a terminal unit, and a call setup control sequence installed in a network need not be modified.

The above and other objects, features, and advantages of the present invention will become more apparent from the Following detailed description with reference to the drawings.

DETAILED DESCRIPTION OF THE PREFERRED EMBODIMENTS

Figure 1:
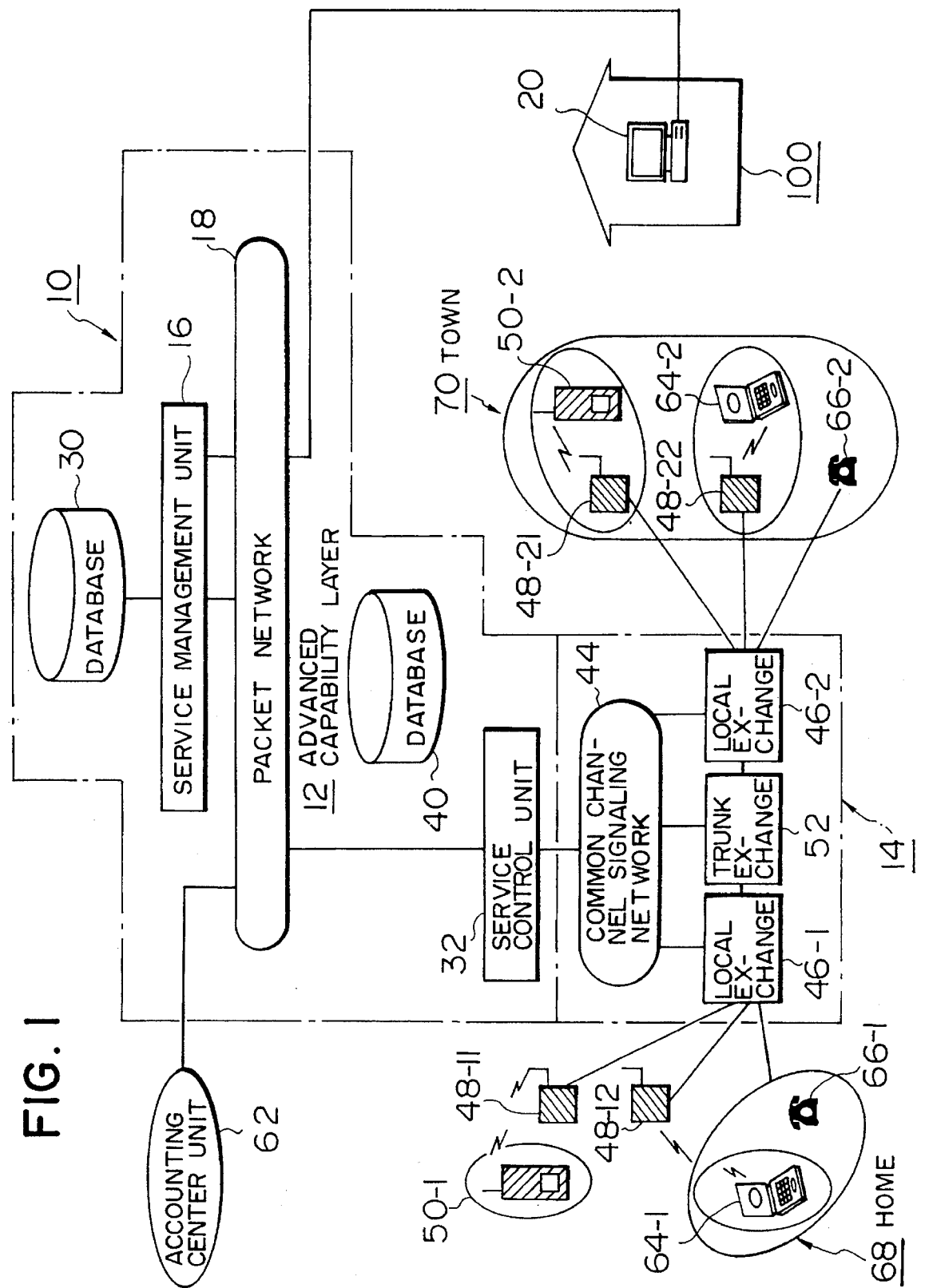
FIG. 1 is an explanatory diagram showing a network architecture realizing a credit accounting service of the present invention.

In FIG. 1, a credit accounting service system of the present invention is realized based on an intelligent network 10. The intelligent network 10 comprises a high-order advanced capability layer 12 and a low-order transmission layer 14. The advanced capability layer 12 accommodates a service management unit 16 having a database 30. The service management unit 16 is responsible for network access management, service management, and customer control for controlling user-related services and supplying information. The service management unit 16 is referred to as a service management point in the intelligent network 10. A data terminal equipment 20 is connected to the service management unit 16 over a packet network 18, so that the service management unit 16 can render various services and supply information in response to user requests. In the credit card accounting service system of the present invention, the data terminal equipment 20 is placed in a rental company 100 which does rental business of, for example, portable telephones. The data terminal equipment 20 placed in the company company 100 transmits online a registration request, a modification request, and a cancellation request for a credit accounting service to the intelligent network 10.

A service control unit 32 having a database 40 is installed to operate under the control of the service management unit 16 in the advanced capability layer 12. The service control unit 32 controls practical communication services under the control of the service management unit 16. Examples of practical services controlled by the service control unit 32 include, for example, a number conversion service for converging a special number into a connection destination number, an accounting service including modification of a designated accounting destination, and a connection control service including screening high-frequency distribution. The service control unit 32 is referred to as a service control point in the intelligent network 10. According to the present invention, a new credit accounting service is included in the accounting service rendered by the service control unit 32.

The transmission layer 14 of the intelligent network 10 accommodates local exchanges 46-1 and 46-2 interconnected over a common channel signaling network 44. The local exchange 46-1 in this embodiment is connected to base stations 48-11 and 48-12 for cordless terminal units as well as a telephone 66-1. The base station 48-11 communicates speech with, for example, a portable telephone 50-1. The base station 48-12 communicates with a mobile data terminal unit 64-1 placed in a home 68. The local exchange 46-2 is connected to base stations 48-21 and 48-22 as well as a telephone 66-2. Terminal units connected to the local exchange 46-2 are intended to be used in, for example, a town 70. A portable telephone 50-2 communicates with the base station 48-21 and a mobile data terminal unit 64-2 communicates with the base station 48-22. The transmission layer 14 further accommodates a trunk exchange 52 for switching connections with the local exchanges 46-1 and 46-2 located differently.

Figure 2:
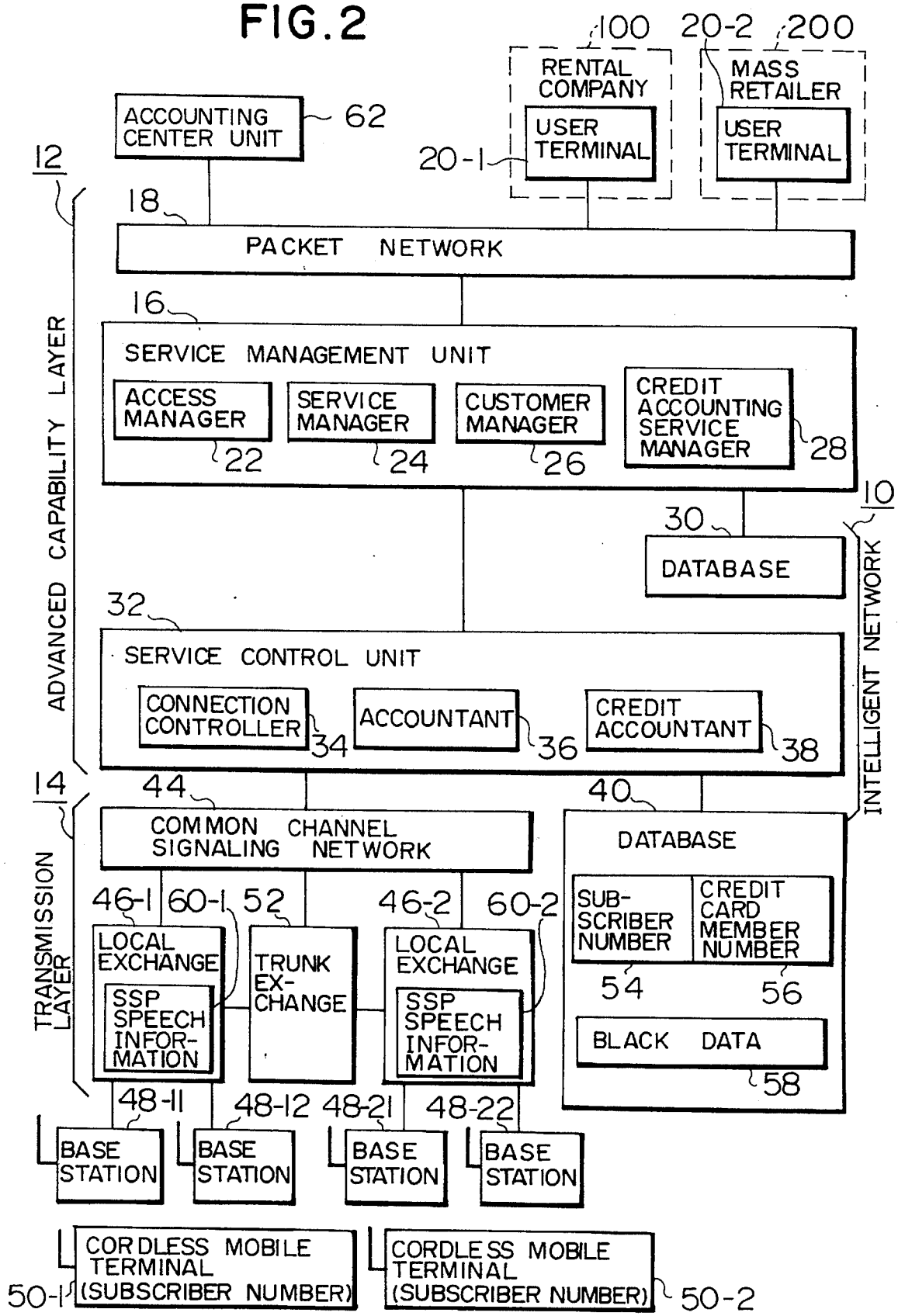
FIG. 2 is a functional block diagram complementary to FIG. 1.

FIG. 2 shows the details of facilities included in a network architecture in which the credit accounting service of the present invention is realized. The service management unit 16 accommodated in the advanced capability layer 12 of the intelligent network 10 includes an access manager 22, a service manager 24, a customer manager 26, and a credit accounting service manager 28 for realizing the credit accounting service of the present invention. A data terminal equipment 20-1 placed in the rental company 100 and a data terminal equipment 20-2 placed in a mass retailer 200 are connected to the service management unit 16 over a data transmission network such as the packet network 18.

The credit accounting service manager 28 receives a service order from the data terminal equipment 20-1 in the rental company 100 or the data terminal equipment 20-2 in the mass retailer 200, and executes a necessary sequence related to a credit accounting service. There are three service orders related to the credit accounting service as listed below.

1) Registration request for a credit card accounting service
2) Cancellation request for a credit accounting service
3) Modification request for a credit card accounting service With each of these service orders, the data terminal equipment 20-1 or 20-2 sends online at least service request information including a credit card member number of a credit card to be used and a subscriber number of a terminal unit to be rented or purchased in the form of an electronic message. In response to the credit card accounting service registration request that is issued initially, a credit card member number sent from, for example, the data terminal equipment 20-1 in the rental company 100 is used to reference black data preset in the database 30 and check if an associated credit card has been used illegally. The black data for use in checking if a credit card has been used illegally is supplied to the intelligent network constructed by a mobile communication company by a credit card company which withdraws money as part of a credit accounting service. The black data is a listing of credit card member numbers of credit cards stolen or counterfeited. When the black data is referenced, if it is found that a credit card member number associated with a registration request is absent, the registration request is accepted so that an associated subscriber will be regarded as an object of a credit accounting service. Specifically, a credit card member number 56 and a subscriber number 54 are stored as a pair in the database 40 in the service control unit 32. The black data for use in registering a subscriber is stored as black data 58 in the database 40. The black data 58 is used to control a call setup request issued from a subscriber terminal unit. In response to a credit accounting service cancellation request, the subscriber number 54 and credit card member number 56 which are stored in the database are canceled. In response to a credit accounting service modification request, the subscriber number 54 or credit card member number 56 is modified and registered.

The service control unit 32 accommodated in the advanced capability layer 12 includes a connection controller 34, an accountant 36, and a credit accountant 38 for executing accounting as part of a credit accounting service of the present invention. The credit accountant 38 reads the credit card member number 56, which has been stored in the database 40 during call setup control, using the subscriber number 54 as a key and specifies the read credit card member number 56 in SSP speech information 60-1 or 60-2 residing in the local exchange 46-1 or 46-2 accommodated in the transmission layer 14. Every time speech terminates, credit accounting information containing the credit card member number 56 is produced using the SSP speech information 60-1 or 60-2 provided by the exchange, and then, in this embodiment, transmitted online to an accounting center unit 62 over the packet network 18.

Figure 3:
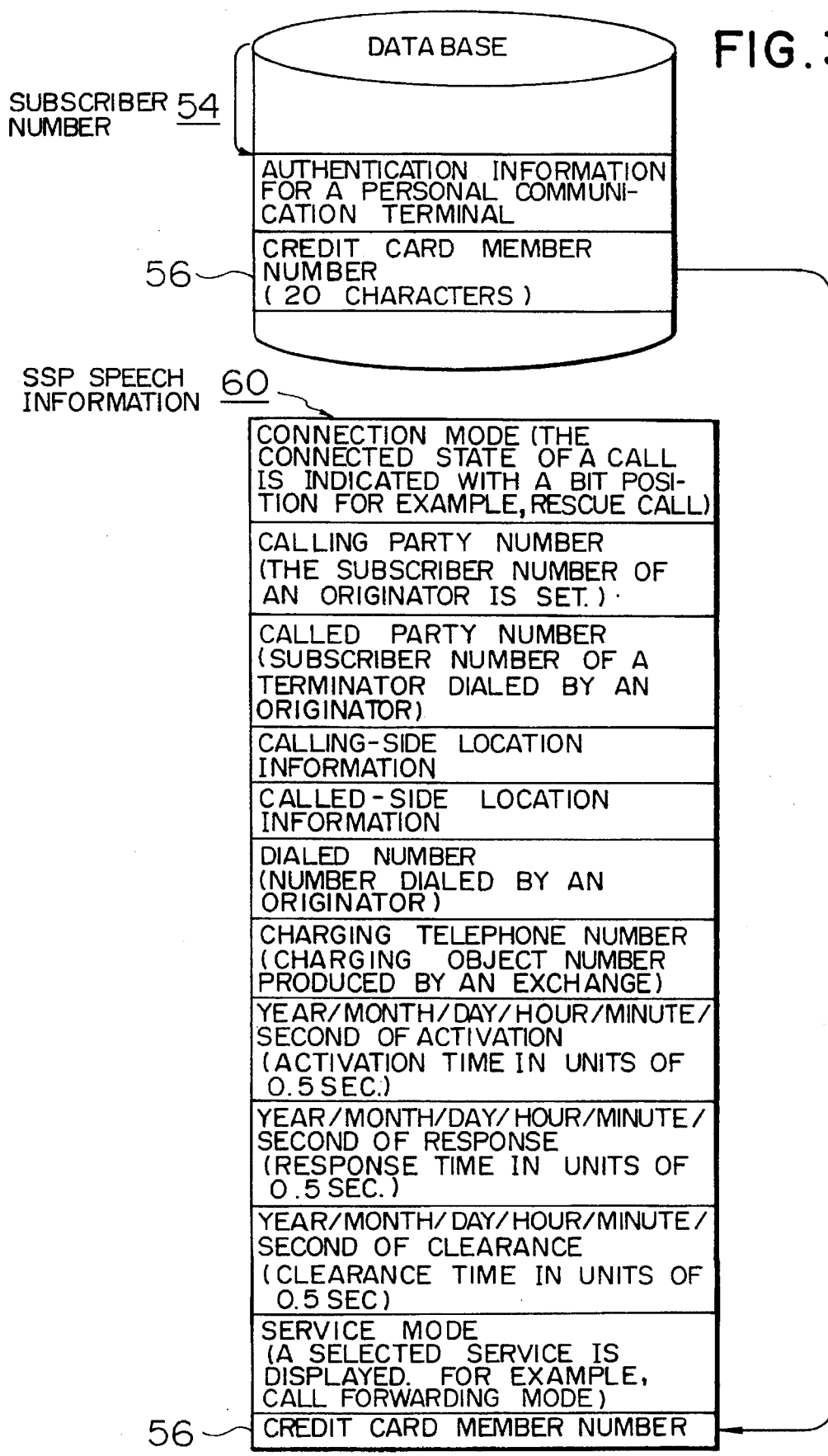
FIG. 3 is an explanatory diagram showing a registered credit card member number and speech information.

FIG. 3 illustrates how to retrieve the database 40 in response to a call setup request issued from the portable telephone 50-1 or 50-2 and shows the contents of speech information produced by an exchange. When a call setup request is issued from a portable telephone, the database 40 is retrieved using the subscriber number 54 acquired from the call setup request in order to read authentication information concerning a personal communication terminal unit that is a portable telephone originating a call and the preset credit card member number 56. The credit card member number 56 is specified in the speech information 60 produced by the exchange having accepted the call setup request. The speech information 60 produced by the exchange contains, as shown in FIG. 3, a connection mode, a calling party number, a called party number, calling-side location information, called-side location information, a dialed number, a charging telephone number, a year/month/day/hour/minute/second of activation, a year/month/day/hour/minute/second of response, a year/month/day/hour/minute/second of clearance, and a service mode. The calling-side location information and called-side location information are inherent to portable telephones. Communication distance information is derived from the location information, which enables charging dependent on a distance. The speech information 60 may contain other necessary information, for example, a personal communication terminal ID and a base (or cell) station ID. Every time a portable telephone whose subscriber is registered for a credit accounting service issues a call setup request, the connection controller 34 incorporated in the service control unit 32 may reference the black data 58 to check on the credit card member number 56 retrieved from the database 40 using the subscriber number 54 and determine whether an associated credit card has been used illegally.

Next, assuming that a portable telephone is used on a rental basis, a sequence from establishment of a credit accounting service to termination of a rental contract will be described with reference to FIGS. 4 to 10.

Figure 4:
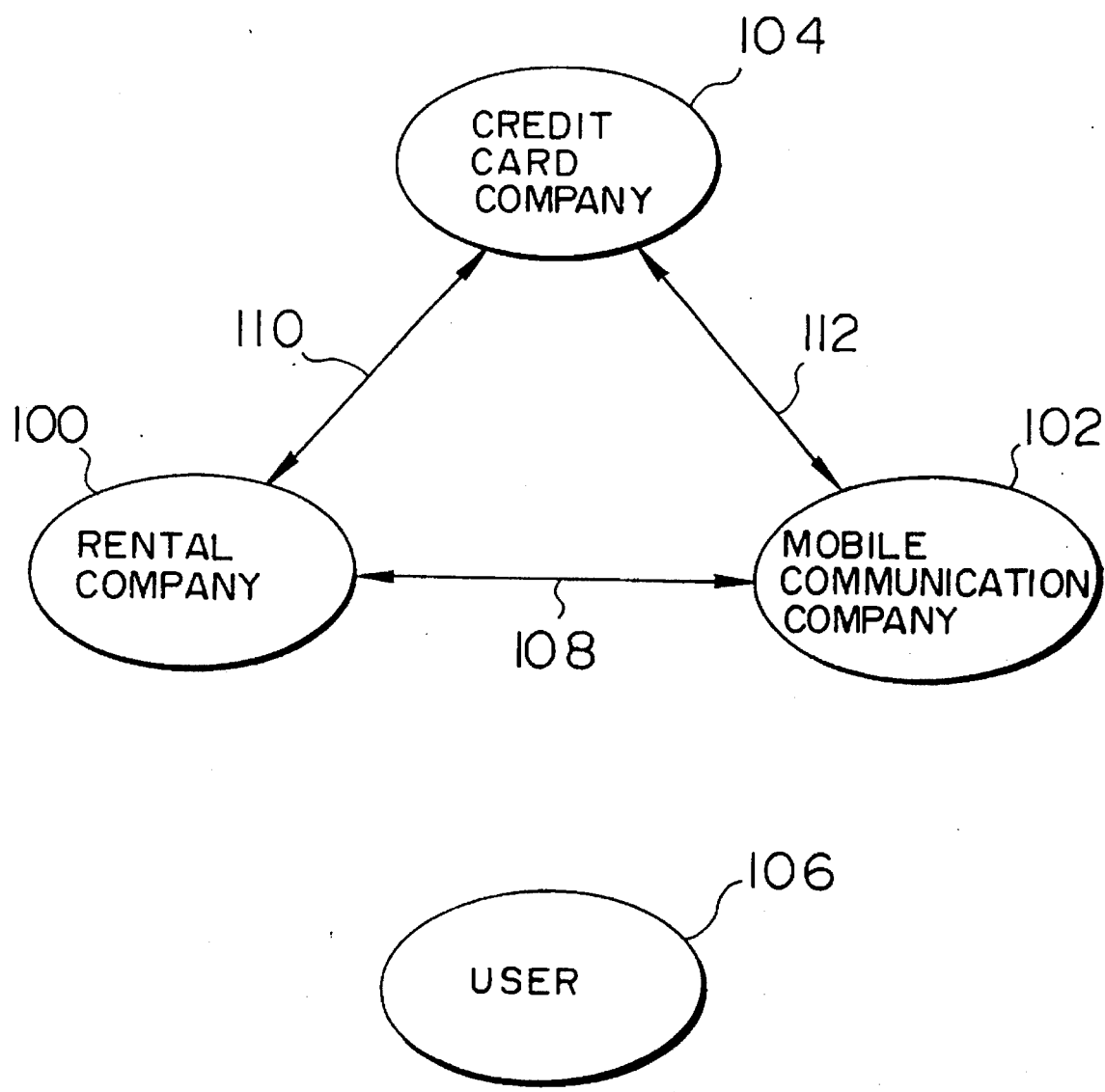
FIG. 4 is an explanatory diagram showing an initial stage in which a rental company makes a contract for a credit accounting service.

FIG. 4 shows a stage in which basic business contracts are made as preparations among a rental company, a mobile communication company, and a credit card company prior to establishment of a credit accounting service of the present invention. In order to realize the credit accounting service of the present invention, a rental company 100 concludes a contract of rental business 108 with a mobile communication company 102 and enters into a contract of affiliation 110 for settlement of rentals with a credit card company 104. At the same time, the mobile communication company 102 makes a contract of affiliation 112 for handling of communication service-related expenses; that is, fees including a basic communication fee and a communication fee with the credit card company 104.

Figure 5:
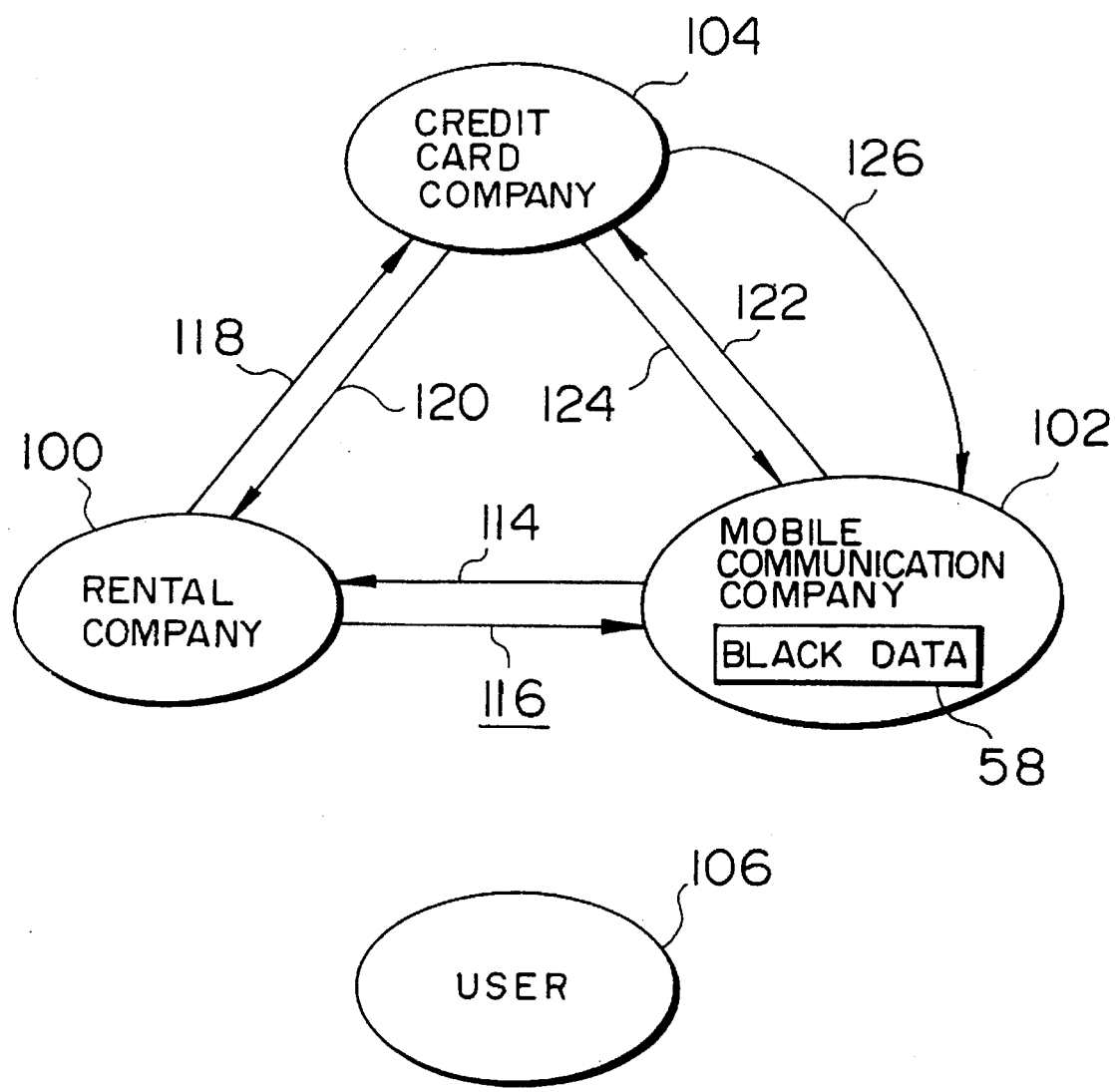
FIG. 5 is an explanatory diagram showing relationships among a rental company, a mobile communication company, and a credit company.

FIG. 5 shows a stage in which various information is transferred among a rental company, a mobile communication company, and a credit card company during rendering of a credit accounting service of the present invention. When lending an equipment to a user 106, the rental company 100 asks the mobile communication company 102 to register or cancel the user 106 for or from the credit accounting service. The mobile communication company has supplied a necessary rental equipment 114 to the rental company 100. For each rental equipment to be lent to the user 106, the rental company 100 issues a bill 118 of a rental fee to the credit card company 104 using a credit card, and the credit card company 104 in turn settles up 120 the bill. The credit card company 104 withdraws money from the user's bank account as usual according to the usage of his/her credit card.

The mobile communication company 102 issues a bill 122 of communication expenses to the credit card company 104, for example, once a month. The credit card company 104 in turn settles up 124 the bill. The credit card company 104 periodically supplies investigated credit standing data 126 to the mobile communication company 102. The investigated credit standing data is a listing of credit card member numbers indicating credit cards that have been used illegally. When receiving the investigated credit standing data 126, the mobile communication company 102 stores it as black data 58 in the database in the network, and uses the black data 58 for investigation of a credit standing performed every time a registration request is issued from the rental company 100 and every time communication setup control is executed for each operation of the user's 106 equipment. Normally, the investigated credit standing data supplied from the credit card company 104 is batched in the form of a magnetic tape or floppy disk. A service request issued from the rental company 100 to the mobile communication company 102 enables registration for any service other than the credit accounting service of the present invention. Services rendered over the intelligent network 10 to which the present invention applies include, for example, an incoming call transfer service, a three-party speech service, and a camp on service. What is referred to as a camp on service is a service in which even when a partner clears a call during speech, if it is detected that the partner has terminated speech, both parties are called and allowed to have speech.

Figure 6:
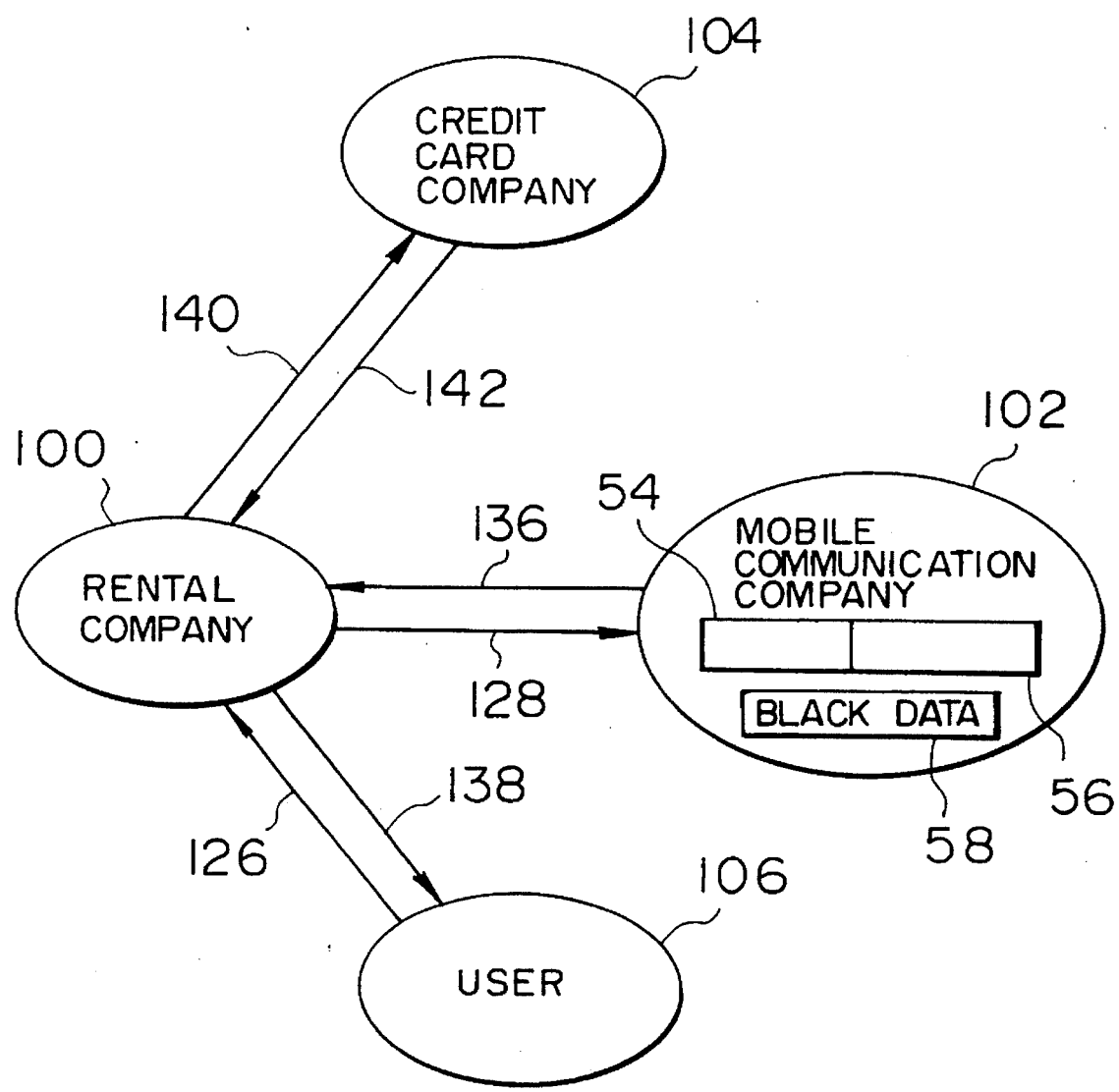
FIG. 6 is an explanatory diagram showing a stage in which a rental company registers a user for a credit accounting service.

FIG. 6 shows a stage in which the rental company 100 asks the mobile communication company 102 to register a user Cot a credit accounting service. The user 106 who wants to uses a portable telephone on a rental basis presents his/her credit card and makes an application 126 to the rental company 100. When accepting the application made by the user 106, the rental company 100 issues a bill 140 of a rental fee to the credit card company 104. The bill 140 is settled up 142 in due time. The rental company 100 uses its own data terminal equipment to make a credit accounting service registration application 128 to the mobile communication company 102. The registration application 128 specifies a subscriber number 54 of a rental portable telephone and a credit card member number 56 of a credit card presented by the user 106. A card reader placed in the rental company 100 is used to extract the credit card member number 56. In general, a credit card member number is stored as a number composed of 20 characters in the third track of magnetic data in a credit card. Needless to say, an IC card may be used as a credit card in place of the magnetic card.

When receiving the credit accounting service registration application 128 online from the rental company 100, the mobile communication company 102 references the black data 58, which is investigated credit standing data supplied by the credit card company 104, to check if the credit card member number 56 is present in the black data 58. If the credit card member number 56 is absent from the black data 58, the credit card member number 56 and the subscriber number 54 are stored as a pair in the database in the network. The credit card member number 56 and subscriber number 54 are set in an exchange so that call setup control can be executed for the subscriber number 54. Finally, a Registration Completed report 136 is returned online to the rental company 100. The issuance of the credit accounting service registration application 128 from the rental company 100 and the return of the response to a registration request for establishment of a service from the mobile communication company are achieved automatically. Since the issuance and return are online jobs, they can be effected immediately. The user 106 can therefore use a rental equipment immediately.

Figure 7:
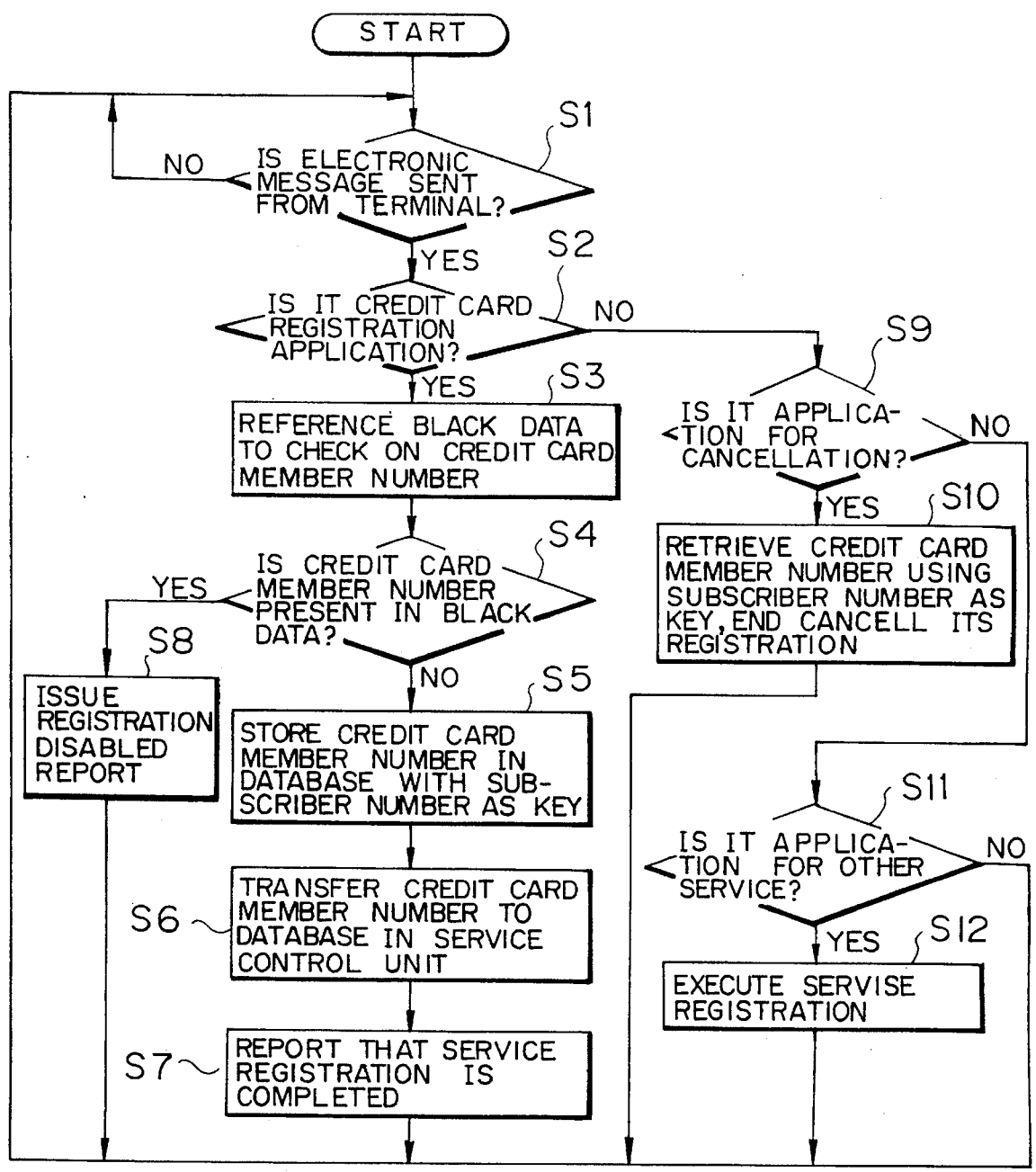
FIG. 7 is a flowchart showing credit accounting service registration under the circumstances shown in FIG. 6.

The flowchart of FIG. 7 shows registration for a credit accounting service that is executed by the mobile communication company 102 having received a credit accounting service registration application from a rental company; that is, a sequence followed by the credit accounting service manager 28 accommodated in the advanced capability layer 12 of the intelligent network 10 shown in FIG. 2. First, at step S1, it is checked if an electronic message has been sent from a data terminal equipment placed in the rental company 100. When an electronic message has been received, control is passed to step S2. It is then checked if a registration application for a credit card accounting service is made. If a registration application For a credit card accounting service is made, the black data 58 in the database is referenced to check on a received credit card member number at step $3. If the credit card member number is absent from the black data, control is passed from step S4 to step S5. The credit card member number is stored in the database with the subscriber number 54 as a key. At step S6, the credit card member number 56 is transferred to the database 40 in the service control unit 32 and stored with the subscriber number 54 as a key. Finally, at step S7, Service Registration Completed is reported to the data terminal equipment.

If it is found at step S4 that the credit card member number is present in the black data, it means that an associated credit card has been used illegally. Control is then passed to step S8. A Registration Disabled report is sent to the data terminal equipment. If it is found at step S2 that the received electronic message is not a credit card accounting service registration application, control is passed to step S9. It is then checked if the message is a cancellation application. If the message is a cancellation application, control is passed to step S10. A credit card member number retrieved using a subscriber number as a key is canceled from the database. If it is found at step S9 that the message is not a cancellation application, control is passed to step S11. It is then checked if the message is a registration application for any other service. If the message is a registration application for any other service, registration for the service is carried out at step S12.

Figure 8:
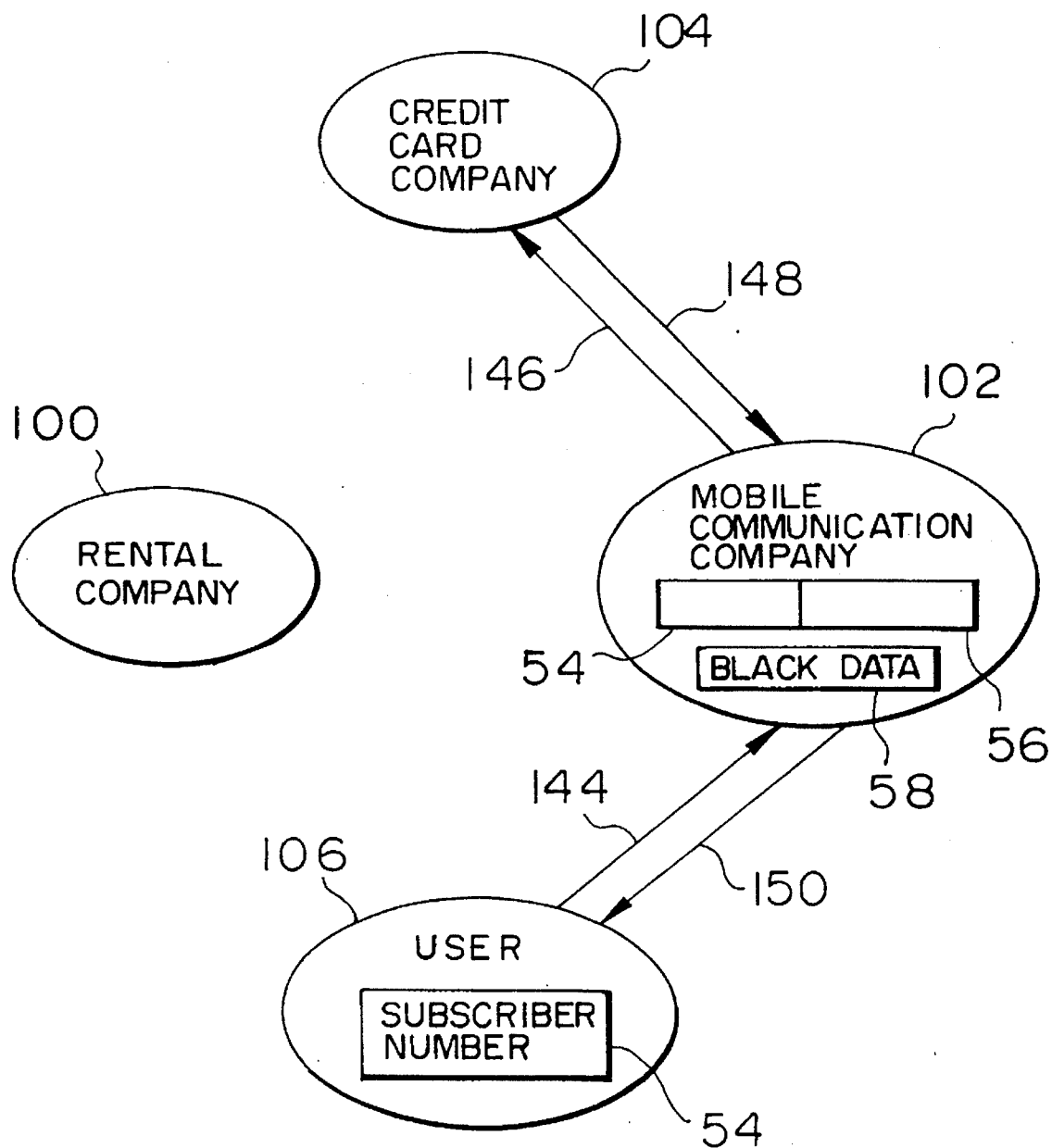
FIG. 8 is an explanatory diagram showing a credit accounting service rendered to a user who uses a rental terminal unit.

FIG. 8 illustrates a sequence followed after a user has been registered for a credit accounting service and then communicated speech using a rental portable telephone. When the user 106 uses a portable telephone rented from the rental company 100 to communicate speech 114 over the network constructed by the mobile communication company 102, the credit card member number 56 is retrieved from the database using a subscriber number 54 specified in a call setup request issued from the user 106. When it is recognized that the credit accounting service is requested to be rendered, credit accounting is executed. Accounting data acquired during credit accounting are collected at the fee center. Communication expenses are calculated one a month. A bill 146 of communication expenses is then issued to the credit card company 104. The credit card company 104 then settles up 148 the bill 146 of communication expenses with the mobile communication company 102. When issuing the bill 146 of communication expenses to the credit card company 104, the mobile communication company 102 issues a statement of use 150 to the user 106.

Figure 9:
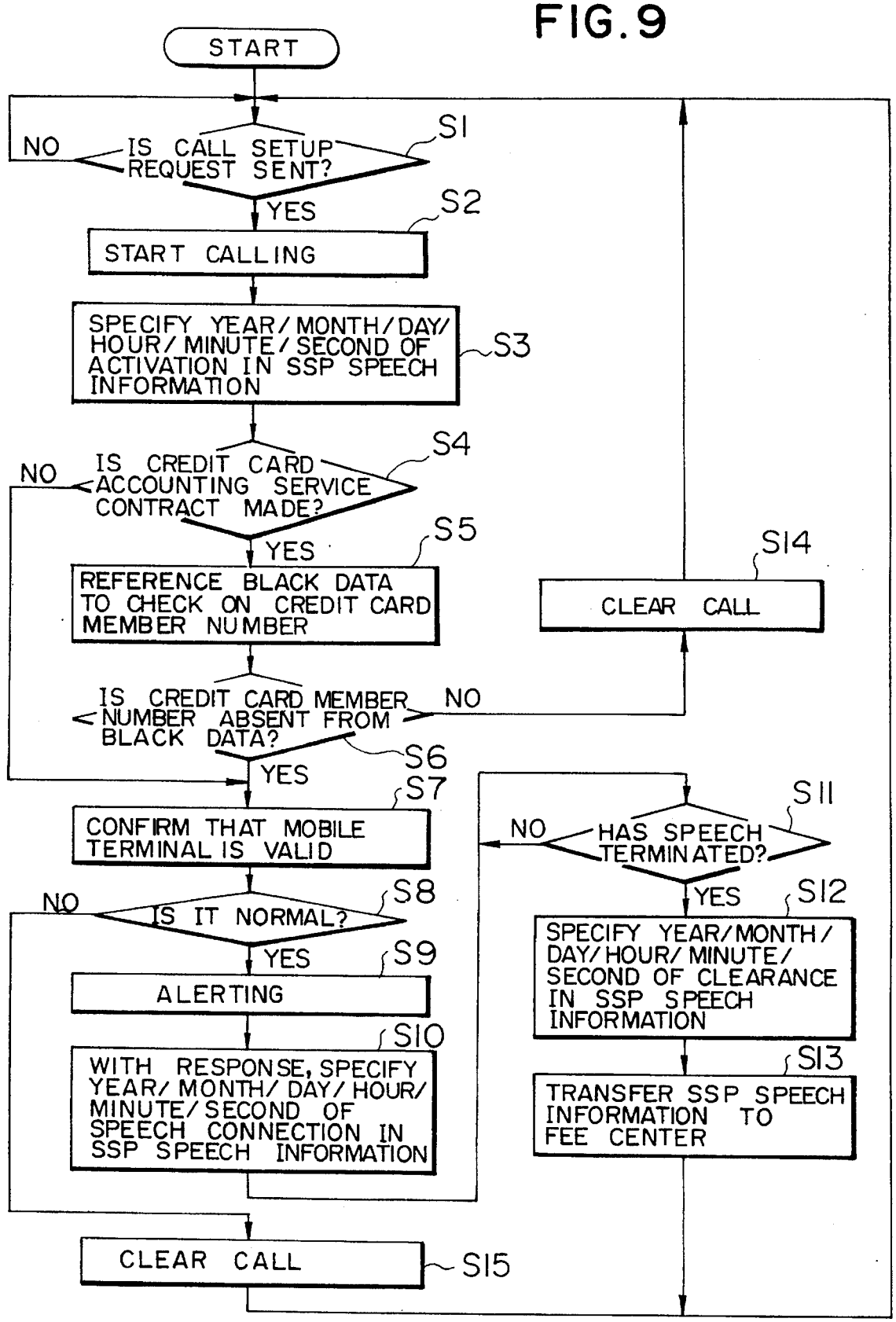
FIG. 9 is a flowchart showing speech setup control executed for the terminal unit shown in FIG. 8.

The flowchart of FIG. 9 shows speech setup control to be executed after registration for a credit accounting service of the present invention is complete. That is, a speech control sequence involving the service control unit 32 and transmission layer 14 of the intelligent network 10 shown in FIG. 2. Assume that a subscriber renting the portable telephone 50-1 in FIG. 2 dials a partner's telephone number and presses a Start button. The local exchange 46-1 connected to the base station 48-11 determines at step S1 whether a call setup request is issued. At step S2, the local exchange 46-1 starts calling. At step S3, the local exchange 46-1 specifies the year/month/day/hour/minute/second of activation in the SSP speech information 60-1 residing therein. Next, a subscriber number is sent to the service control unit 32 in the advanced capability layer 12 via the common channel signaling network 44, and the database 40 is retrieved. In other words, the credit card member number 56 is retrieved from the database 40 using the subscriber number 54 as a key. When the credit card member number 56 is retrieved, it is determined at step S4 that a contract for a credit card accounting service has been made. Control is then passed to step S5. At step S5, the black data 58 in the database 40 is referenced to check on the retrieved credit card member number. If the credit card member number is absent, it is determined at step S6 that there is no problem. Control is then passed to step S7 and thereafter. If the credit card member number is present in the black data 58, control is passed to step S14. Clearance is determined relative to the call setup request. At this time, it is preferred that a message saying that the credit card has been used illegally be conveyed to the subscriber. When control is passed from step S6 to step S7 because the credit card has no problem, the validity of the portable telephone 50-1 is confirmed. For confirmation of the validity of the portable telephone 50-1, the local exchange 46-1 transmits a certification random number, which has been read from the database 40 shown in FIG. 3 using the subscriber number 54, as certification information concerning a personal communication terminal unit to the portable telephone 50-1. In response to the certification random number, the portable telephone 50-1 executes a given operation of certification and returns the result of operation to the local exchange 46-1. When determining at step S8 that the received result of operation of certification is normal, the local exchange 46-1 passes control to step S9 and shifts to partner calling. If the result of operation of certification is abnormal, clearance is executed at step S15. Control is shifted to partner calling at step S9. When a partner returns a response, speech connection is executed at step S10. Thus, a speech state is established. When the called partner returns a response, the year/month/day/hour/minute/second of response is specified in the SSP speech information 60-1. During speech, it is checked at step S11 if speech has terminated. When it is determined that speech has terminated, the year/month/day/hour/minute/second of clearance is specified in the SSP speech information 60-1. Finally, at step S13, the SSP speech information 60-1 produced by the local exchange 46-1 is read and transferred to the fee center unit 62 over the packet network 18.

Figure 10:
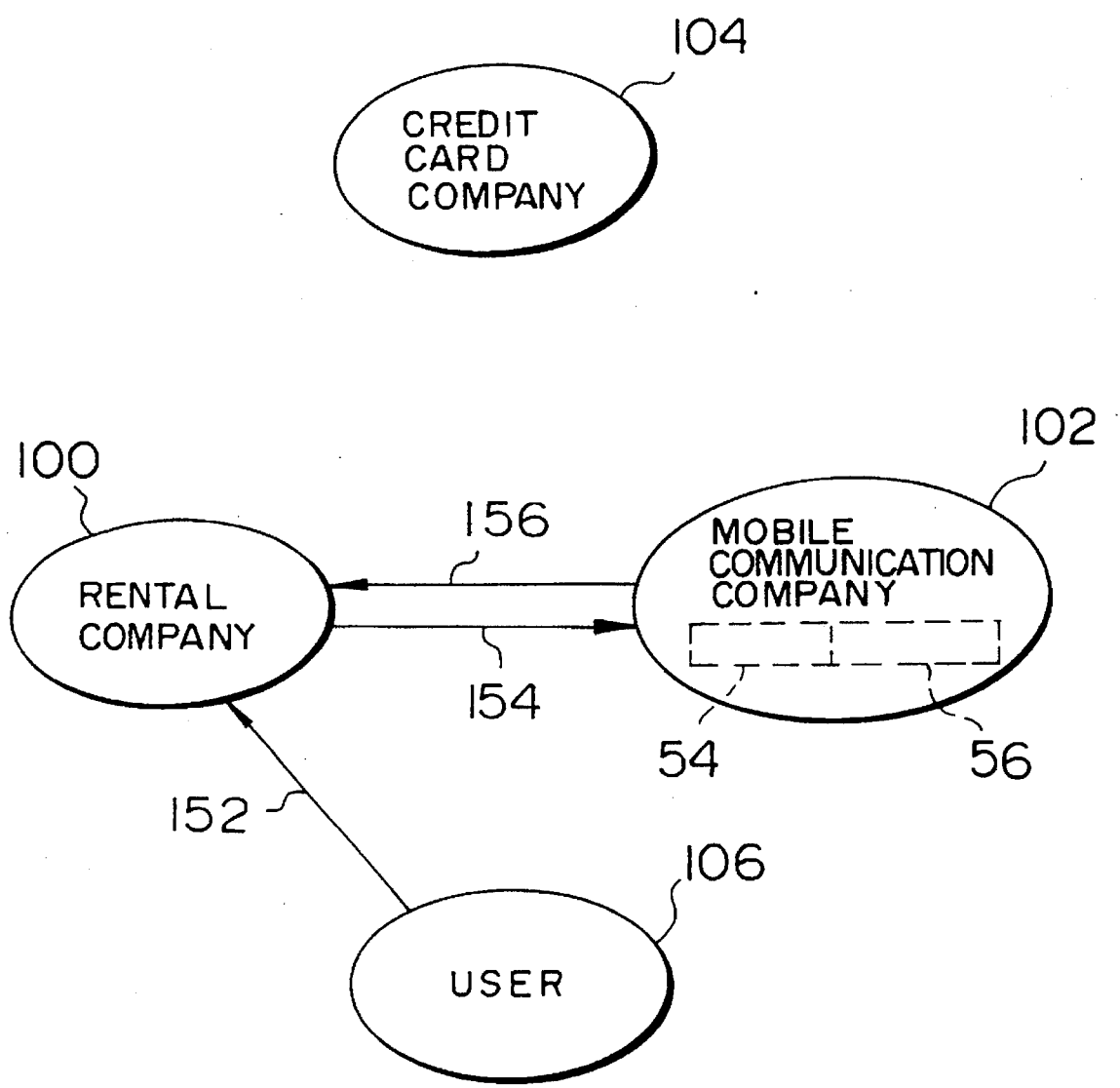
FIG. 10 is an explanatory diagram showing a credit accounting service in a stage in which a rental contract terminates.

FIG. 10 shows a stage in which a rental contract is terminated. When the user 106 wants to terminate a rental contract 152, he/she returns his/her rental equipment and presents his/her credit card. The rental company 100 uses the credit card presented by the user 106 so as to make a credit accounting service cancellation application 154 to the mobile communication company 102. In response to the cancellation application 154, the intelligent network constructed by the mobile communication company 102 retrieves the credit card member number 56 from the database using the subscriber number 54 as a key and cancels the credit card member number 56. When the credit card member number has been canceled, a Cancellation Completed report 156 is sent to the rental company 100. When the cancellation of the credit card member number 56 causes the mobile communication company 102 to settle up expenses, summation is executed as part of the credit accounting service. Expenses are then billed to the credit card company 104.

FIGS. 11 to 14 are explanatory diagrams showing the stages of a credit accounting service of the present invention to be rendered to a user who has purchased a portable telephone at a mass retailer.

Figure 11:
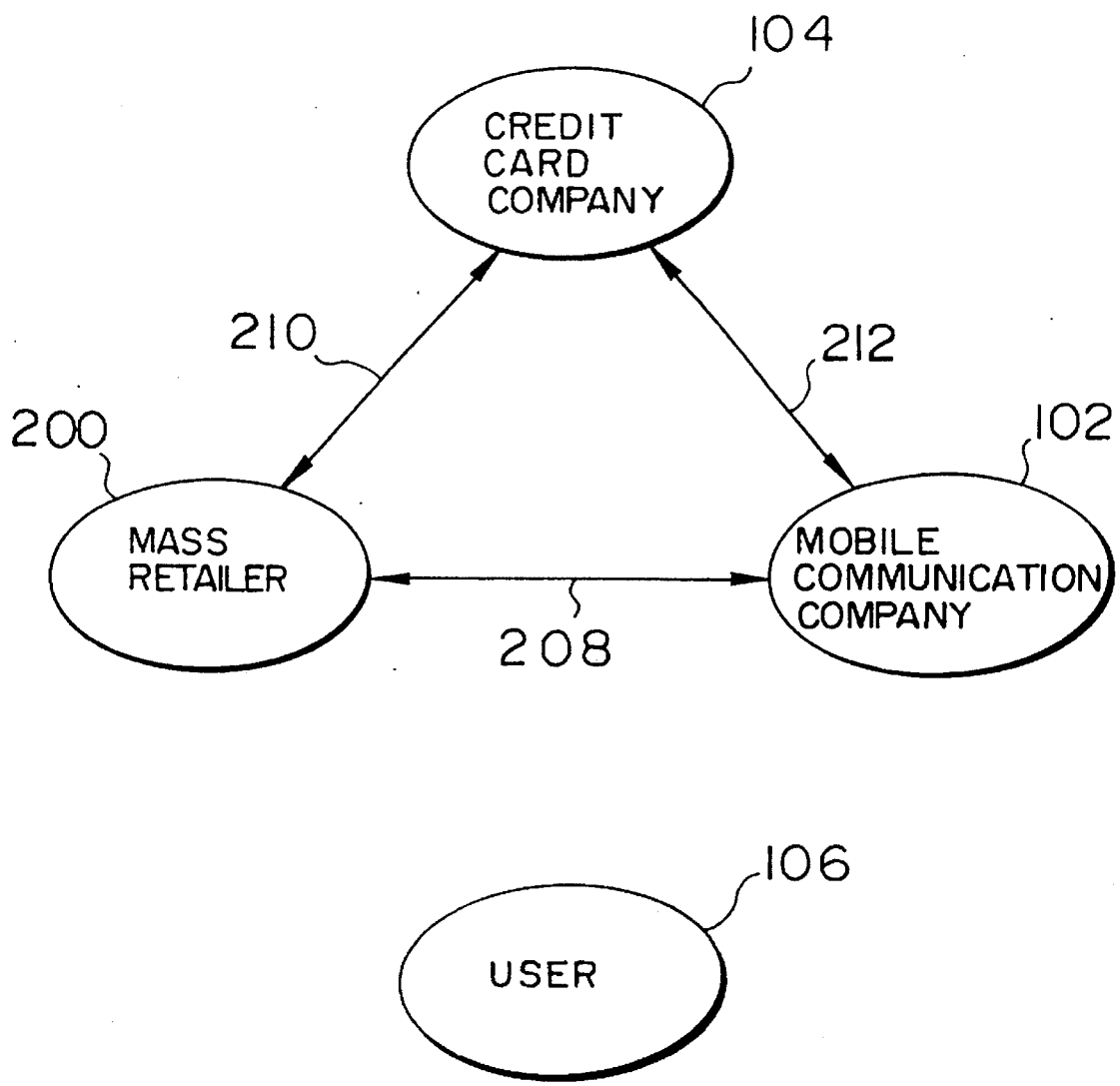
FIG. 11 is an explanatory diagram showing an initial state in which a mass retailer makes a credit accounting service.

FIG. 11 shows a stage in which a mass retailer, a mobile communication company, and a credit card company make preparations for system construction. Both a mass retailer 200 and the mobile communication company 102 have entered into contracts 210 and 212 of affiliation with the credit card company 104.

Figure 12:
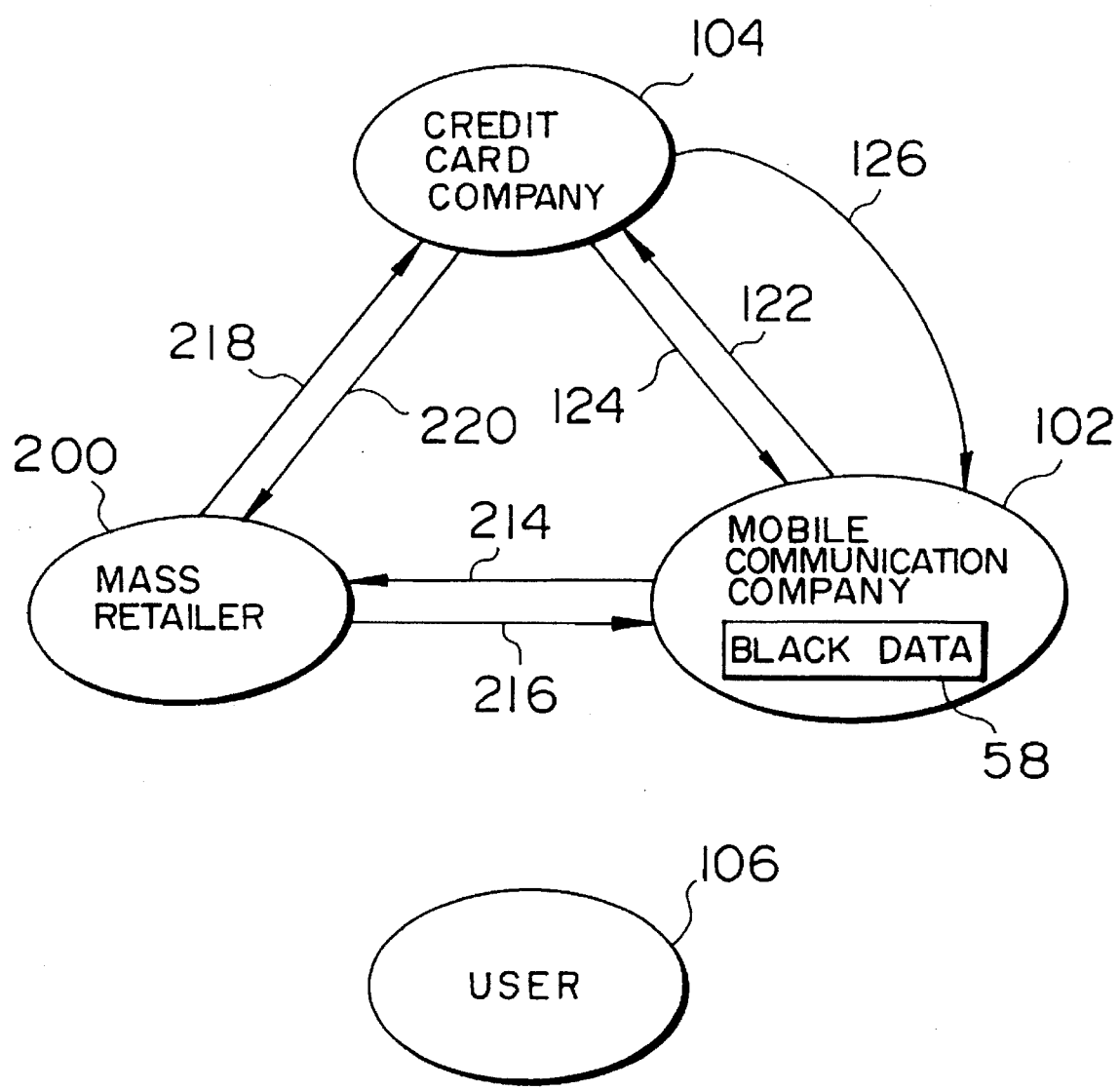
FIG. 12 is an explanatory diagram showing relationships among a mass retailer, a mobile communication company, and a credit company.

FIG. 12 shows a stage in which information is transferred in order to render a credit accounting service to a user who has purchased an equipment at a mass retailer. What differs from FIG. 5 in which the rental company 100 is involved is that a bill issued from the mass retailer 200 to the credit company 104 is a bill 218 of a selling price. The other relationships between the mass retailer 200 and mobile communication company 102 and between the mobile communication company 102 and credit card company 104 are identical to those in FIG. 5 in which the rental company is involved.

Figure 13:
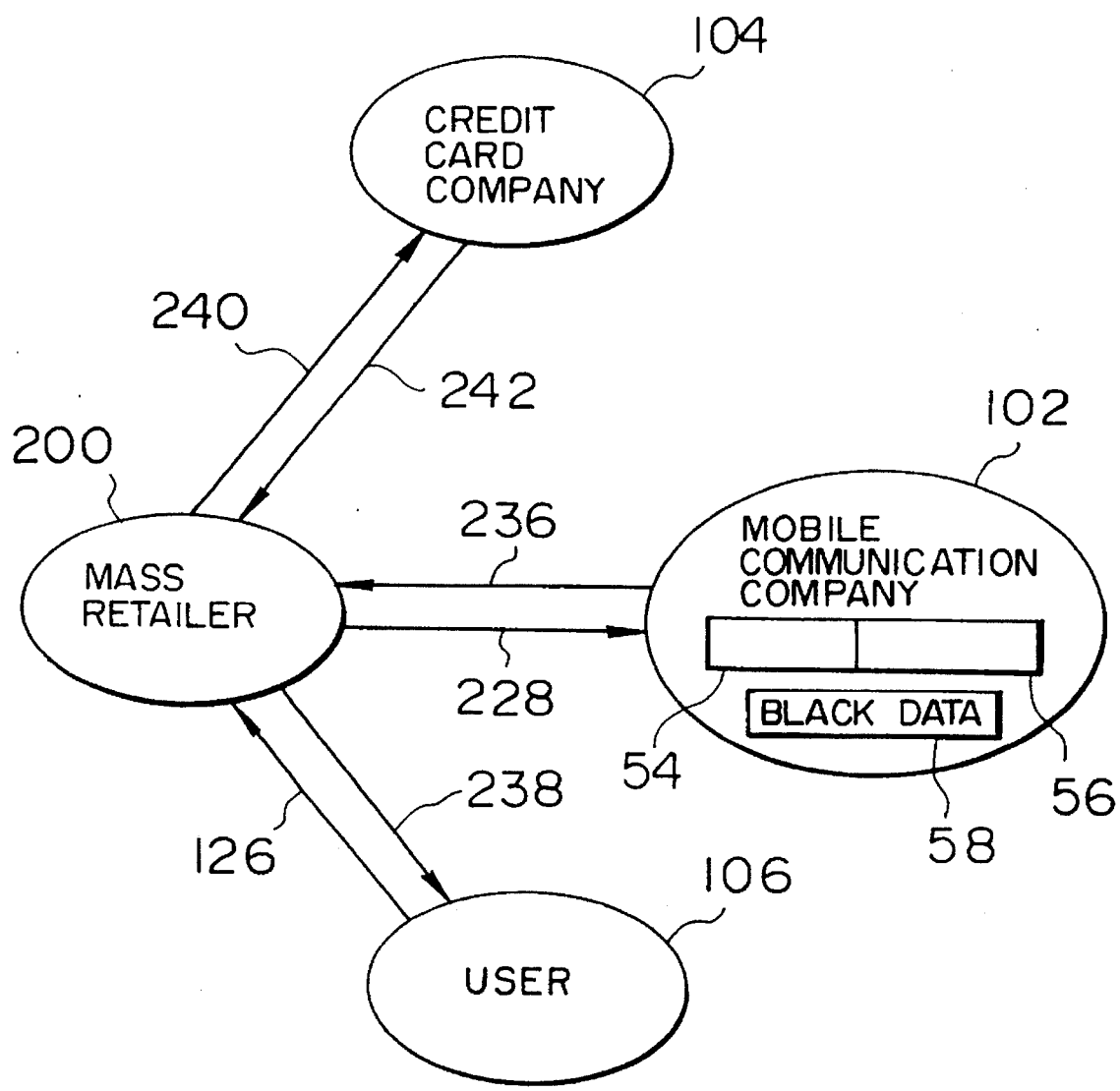
FIG. 13 is an explanatory diagram showing a state in which a mass retailer registers a user for a credit accounting service.

FIG. 13 shows a stage in which a registration application for a credit accounting service is made for the sake of the user 106 who has purchased a portable telephone at the mass retailer 200. When the user 106 purchases a portable telephone at the mass retailer 200, he/she presents his/her credit card and makes an application 126. When receiving the credit card, the mass retailer 200 issues a bill 240 of a selling price to the credit card company 104. The bill 240 is settled up 242 in due time. The mass retailer 200 also makes a registration application 228 for a credit accounting service to the mobile communication company 102, and stores the credit card member number 56 in the database with the subscriber number 54 as a key. At this time, the black data 58 supplied by the credit card company 104 is referenced to check if an associated credit card has been used illegally. When the registration job terminates normally, a Registration Completed report 236 is sent to the mass retailer 200. The above procedure of making a registration application for a credit accounting service for the sake of the user 106 who has purchased a portable telephone at the mass retailer 200 is executed online. After the Registration Completed report 236 is returned, the user takes delivery 238 of a portable telephone and thus can use the purchased portable telephone immediately.

Figure 14:
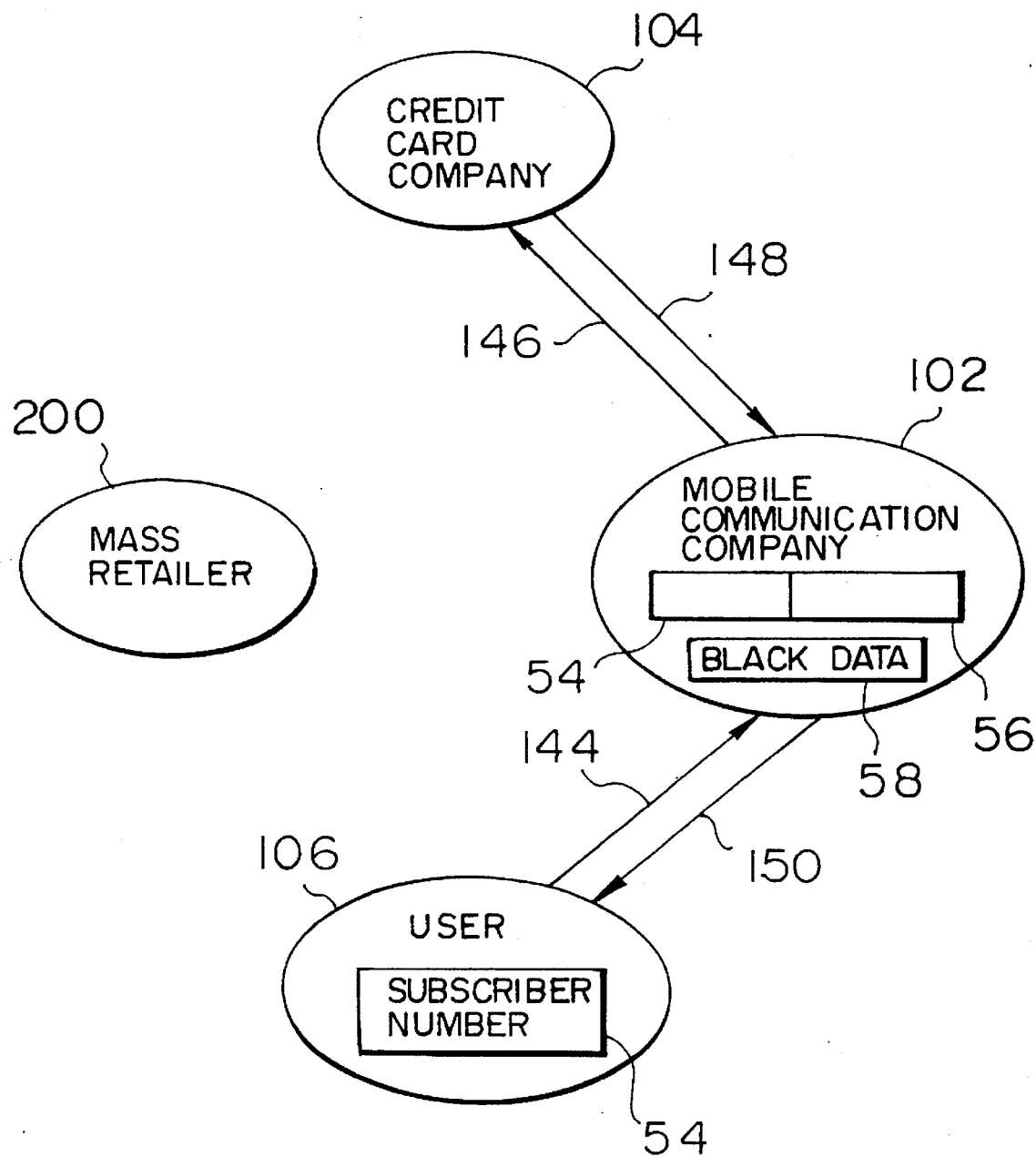
FIG. 14 is an explanatory diagram showing a credit accounting service rendered to a user who uses a purchased terminal unit.

FIG. 14 shows a stage in which the user 106 uses the portable telephone purchased at the mass retailer 200. Similarly to the case in which the portable telephone is rental, every time the user 106 communicates speech 144, the mobile communication company 102 renders a credit accounting service, and issues the bill 146 of communication expenses to the credit card company 104 once a month. The bill 146 is serried up 148 in due time. The mobile communication company 102 issues the statement of use 150 to the user 106.

As described above, the present invention can realize a credit accounting service that is immediately available even for as short a rental period as a period defined in units of an hour during which a portable telephone is rented at an event ground or the like. When a portable telephone is purchased at a mass retailer of home electric appliances, the credit accounting service of the present invention enables immediate use of the purchased portable telephone. For a rental portable telephone, a credit card company settles up both a rental fee and communication expenses. For a purchased portable telephone, the credit card company settles up both a selling price and communication expenses. Thus, a user need not pay for bills issued differently by a rental company and a communication company or by a mass retailer and a communication company. A user will feel carefree in renting a portable telephone or find it beneficial to purchase a portable telephone. Furthermore, a user need not load a credit card into a portable telephone at every communication. This results in simple communication work. The characteristic of a portable telephone being lightweight and compact will not be impaired. Moreover, since a network is provided with credit card member numbers in the form of a database, a credit card accounting service can be rendered effortlessly without the necessity of modifying a speech setup control sequence designed for a standard network.

The aforesaid embodiment has been focused on a credit accounting service. Alternatively to the description of the embodiment, an expiration year/month/day of a credit card may be stored. Then, when an effective period defined with the expiration year/month/day expires, a credit accounting service is terminated. As for management of such a service period, assuming that a portable telephone is used on a rental basis, when a registration application is made, a rental period defined with the number of rental hours, days, or months may be preset. When the rental period expires, a credit accounting service is terminated. When an effective period of a credit card or a rental period expires, not only a credit accounting service is terminated but also communication services themselves may be terminated. Moreover, the intelligent network 10 over which a credit accounting service of the present invention is rendered is constructed as a wide-area network. When a user who has once registered for the credit accounting service moves to another place because of business trip or transfer, he/she need only to make a modification application for the credit accounting service by presenting a subscriber number of a new portable telephone. The user can then be rendered the same credit accounting service as that available in the previous place. The above example can be recognized as a working mode in which a credit accounting service is utilized so as to exert portability.

Furthermore, in the aforesaid embodiment, a portable telephone or a portable data terminal unit is referred to as a subscriber terminal unit. The present invention is not limited to this working mode. A credit accounting service is available for any other appropriate terminal unit.

What is claimed is:

1. A credit card-based accounting service system for a network, comprising:

network means for interconnecting data terminal equipment in a data communication network, managing services related to customers of said data terminal equipment, controlling connections between cordless mobile terminal units, and providing accounting of the services and connections;

a high-order advanced capability layer comprising a service management unit for managing user-related services and a service control unit for controlling connections between the cordless mobile terminal units and providing accounting;

a low-order transmission layer comprising a plurality of exchanges interconnected over a communication line signalling network and base stations for radio communication with the cordless mobile terminal units;

credit accounting service managing means for storing a credit card member number and a subscriber number of the cordless mobile terminal units as a pair as subscriber registration information in a database when a subscriber registration request for a credit card-based credit accounting service issued from said data terminal equipment is received;

illegal use checking means for checking for one of a presence and an absence of an illegal use of said credit card member number with reference to a list of illegally used credit card member numbers which have been registered by the credit card member number obtained from said subscriber registration information when said credit accounting service managing means receives a subscriber registration request, and for permitting a registration only when use of said credit card member number is not used illegally; and credit accounting means for retrieving a credit card member number from said database using a subscriber number and outputting credit withdrawal information in response to a connection request issued from said data terminal equipment, wherein said service control unit retrieves a credit card member number from said database using a subscriber number in response to a speech setup request issued from said mobile terminal units, and writes said credit card member number into service switching point speech information residing in said exchange each time speech is communicated;

wherein said service control unit checks a credit card member number retrieved from said database, in response to a speech setup request, to determine whether or not said credit card member number is being used illegally and when it is determined that it has been used illegally, said credit accounting service managing means stores an originator subscriber number, a partner subscriber number, an activation time comprising a year/month/day/hour/minute/second of activation, a cordless mobile terminal ID, and a base station ID which are acquired from said service switching point speech information.

2. A system according to claim 1, wherein said data terminal equipment transmits at least a subscriber number and a credit card member number as subscriber registration information.

3. A system according to claim 1, wherein when said credit accounting service managing means registers a subscriber, said credit accounting means produces credit withdrawal information concerning a basic communication fee; and when a speech setup request is issued from a subscriber terminal unit, said credit accounting means produces credit withdrawal information concerning a speech fee.

4. A system according to claim 1, wherein when receiving a request for cancellation of registration for a credit accounting service from said data terminal equipment, said credit accounting service managing means cancels a credit card member number stored in said database.

5. A system according to claim 4, wherein when said credit card member number is canceled, said credit accounting means produces credit withdrawal information concerning communication expenses.

6. A system according to claim 1, wherein said exchange stores said credit card member number and produces an originator subscriber number, a terminator subscriber number, calling-side location data, called-side location data, and service switching point speech data comprising an accounting object number, activation time, response time, and clearance time.

7. A system according to claim 1, wherein said service control unit checks a credit card member number retrieved from said database to see if it has been used illegally, when said credit card has not been used illegally, said service control unit executes speech setup control, and when said credit card has been used illegally, said service control unit terminates speech setup control.

8. A system according to claim 1, wherein said credit accounting service managing means receives and handles a subscriber registration request issued from said data terminal equipment placed in a rental company of cordless mobile terminal units.

9. A system according to claim 8, wherein said credit accounting service managing means registers an effective period defined with the numbers of hours, days, or months, during which a mobile cordless terminal unit is usable, in response to a subscriber registration request issued from said data terminal equipment placed in said rental company; and when said effective period expires, said credit accounting service managing means stops communication services.

10. A system according to claim 1, wherein said credit accounting service managing means receives and handles a subscriber registration request issued from said data terminal equipment placed in a mass retailer of cordless mobile terminals.

11. A system according to claim 1, wherein said credit accounting service managing means registers an expiration year/month of said credit card; and when said expiration year/month comes, said credit accounting service managing means stops communication services.

12. A system according to claim 1, wherein:

after registering a subscriber number of said cordless mobile terminal unit and an associated credit card member number corresponding to a subscriber and after receiving a subscriber registration request from another cordless mobile terminal unit used by the subscriber, said network means stores a new subscriber number, with which said subscriber has requested registration, in linkage with said credit card member number in said database; and after receiving a speech setup request from the another cordless mobile terminal unit, said network means invokes a credit card accounting communication service retrieved from said database using said new subscriber number.

13. A system according to claim 1, wherein when receiving a subscriber registration request from said data terminal equipment, said network means stores one communication service mode or a plurality of communication service modes requested by a subscriber together with a subscriber number and a credit card member number in said database, and when receiving a speech setup request from said mobile terminal units, said network means renders a registered communication service retrieved from said database using said subscriber number.

14. A system according to claim 13, wherein said network means renders a call forwarding service, a three party service, and a camp-on service as said communication services.

* * * * *